United States Patent
Lamendola et al.

(10) Patent No.: US 7,612,710 B2
(45) Date of Patent: Nov. 3, 2009

(54) PROCESSING VIRTUAL AND LIVE TRACKS TO FORM A VIRTUAL-OVER-LIVE ENVIRONMENT

(75) Inventors: Joel E. Lamendola, Somerville, MA (US); Aaron T. Spettel, Merrimack, NH (US)

(73) Assignee: Raytheon Company, Waltham, MA (US)

( * ) Notice: Subject to any disclaimer, the term of this patent is extended or adjusted under 35 U.S.C. 154(b) by 178 days.

(21) Appl. No.: 11/872,781

(22) Filed: Oct. 16, 2007

(65) Prior Publication Data

US 2009/0046004 A1 Feb. 19, 2009

Related U.S. Application Data

(60) Provisional application No. 60/956,219, filed on Aug. 16, 2007.

(51) Int. Cl.
*G01S 13/00* (2006.01)
(52) U.S. Cl. .................................. 342/195
(58) Field of Classification Search .......... 342/195
See application file for complete search history.

(56) References Cited

U.S. PATENT DOCUMENTS

| | | | |
|---|---|---|---|
| 5,134,412 A | | 7/1992 | Baseghi et al. |
| 5,421,728 A | | 6/1995 | Milden |
| 5,431,568 A | * | 7/1995 | Fey et al. .................. 434/2 |
| 2004/0227661 A1 | * | 11/2004 | Godsy ..................... 342/70 |
| 2006/0039531 A1 | * | 2/2006 | Neelakantan ............ 378/62 |

OTHER PUBLICATIONS

Dynetics, The Power of Solutions, InFocus Newsletter, vol. 16, Issue 3, Aug. 2006, 4 pages.
Notification of Transmittal of the International Search Report and the Written Opinion of the International Searching Authority, or the Declaration, PCT/US2008/071406 dated Nov. 24, 2008.

* cited by examiner

*Primary Examiner*—Thomas H Tarcza
*Assistant Examiner*—Timothy A Brainard
(74) *Attorney, Agent, or Firm*—Daly, Crowley, Mofford and Durkee, LLP

(57) ABSTRACT

In one aspect, a method includes receiving live radar data, receiving virtual radar data, merging the live radar data and the virtual radar data to form merged data, and tagging the merged data with a virtual tag indicator to indicate a presence of the virtual radar data. The method also includes for each receive time window, determining if the virtual radar data is present from the virtual tag indicator; if the virtual radar data is present, tagging a detection with a virtual tag and if the virtual radar data is not present, tagging detections with a live tag.

20 Claims, 7 Drawing Sheets

PROCESSING VIRTUAL AND LIVE TRACKS TO FORM A VIRTUAL-OVER-LIVE ENVIRONMENT

RELATED APPLICATIONS

This application claims priority to provisional application Ser. No. 60/956,219, entitled "PROCESSING VIRTUAL AND LIVE TRACKS," filed Aug. 16, 2007, which is incorporated herein in its entirety.

BACKGROUND

Radar processing systems process live tracks in a so called live mode or live environment. Some radar processing systems include other modes that instead of tracking live tracks in the live mode, the radar processing system tracks simulated or virtual tracks in a virtual mode or virtual environment. In a virtual mode, a radar processing system may be used to train personnel. Generally, the radar processing system is in either mode but typically not at the same time.

SUMMARY

In one aspect, a method includes receiving live radar data, receiving virtual radar data, merging the live radar data and the virtual radar data to form merged data, and tagging the merged data with a virtual tag indicator to indicate a presence of the virtual radar data. The method also includes for each receive time window, determining if the virtual radar data is present from the virtual tag indicator; if the virtual radar data is present, tagging a detection with a virtual tag and if the virtual radar data is not present, tagging detections with a live tag.

In another aspect, a radar processing system includes a radar interface to receive and merge live radar data and virtual radar data to form merged data. The radar interface is configured to tag the merged data with a virtual tag indicator to indicate a presence of virtual radar data in the merged data. The radar processing system also includes a signal processing system configured to determine if the merged data includes the presence of the virtual radar data from the virtual tag indicator, for each receive time window, the signal processing system being configured, if the merged data includes the virtual radar data, to tag a detection with a virtual tag and if the merged data does not include the virtual data, to tag the detection with a live tag. The radar processing system further includes an application module configured to associate tracks from the detections received from the signal processing system.

In a further aspect, an article includes a machine-readable medium that stores executable instructions to process virtual and live tracks to form a virtual-over-live environment. The instructions cause a machine to merge live radar data and virtual radar data to form merged data and tag the merged data with a virtual tag indicator to indicate a presence of the virtual radar data. The article also includes instructions causing a machine to, for each receive time window, determine if the virtual radar data is present based on the virtual tag indicator, if the virtual radar data is present, tag a detection with a virtual tag; and if the virtual radar data is not present, tag the detections with a live tag.

DETAILED DESCRIPTION

Described herein is an approach to track live and virtual targets simultaneously to form a virtual-over-live environment. For example, the approach described herein allows training scenarios to be implemented using simulated or virtual data while still receiving live data. Thus, users may be able to maintain operational readiness while performing training exercises. In a virtual-over-live environment, a radar processing system, (e.g., a radar processing system 10 (FIG. 1)) identifies tracks as being a virtual track or a live track so that the radar processing system safely operates in an environment with concurrent live and virtual tracks. The approach described herein uses a capability that a typical radar transmits and receives beams with limited beam widths using limited transmit and receive window sizes during each radar resource period.

Figure 1:
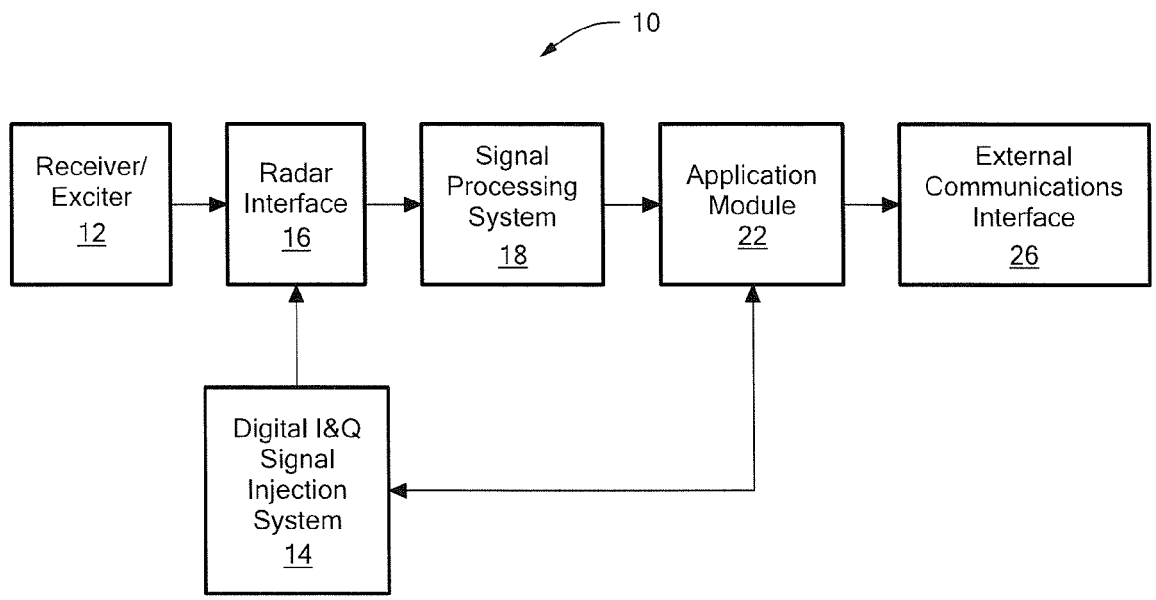
FIG. 1 is a block diagram of a radar system including a digital signal injection system to process live and virtual radar tracks.

Referring to FIG. 1, in one example, a radar processing system 10 includes a receiver/exciter (REX) 12, a digital in-phase and quadrature (I&Q) signal injection system (SIS) 14, a radar interface 16, a signal processing system (SPS) 18, an application module 22 and an external communications interface 26.

The REX 12 receives reflected signals from a target via an antenna (not shown). The reflected signals include live data. The digital I&Q SIS 14 generates or injects virtual data into the radar processing system 10. In one example, the digital I&Q SIS 14 is a Radar Digital Signal Injection System (RD-SIS) developed for the United States Government by the assignee of this patent application. In one example, the digital I&Q SIS 14 will tag digital I&Q messages to the radar interface 16 as virtual data by setting a bit in a message. In one particular example, the bit is a bit in a resource period header in a message from the REX 12 to the SPS 18. The bit in the resource period header is defined as a virtual tag indicator. In one example, the presence of virtual injections in the associated resource period will be indicated when the bit is set (e.g., the bit is set to 1) and a bit unset (e.g., the bit set to 0) will indicate that no virtual injections are present in the associated resource period.

The radar interface 16 merges the live and virtual data and provides the merged live and virtual data to the SPS 18. For example, in a virtual-over-live environment, a command message is sent to the radar interface 16 via an Ethernet connection (not shown) with instructions to change the source of the resource period header to "Test," for example. The command message causes the radar interface 16 to include the resource period message header received from the digital I&Q SIS 14 when sending a message to the SPS 18 for the associated resource period, thereby sending the virtual tag to the SPS 18 via the virtual tag indicator contained in the resource period message header.

The SPS 18 performs analog-to-digital conversion and detection processing. The SPS 18 analyzes the signals received and passes the resulting detection information to the application module 22. The SPS 18 evaluates the virtual tag indicator for an indication of a virtual injection (i.e., determining if the virtual tag indicator is set). If the SPS 18 detects that the virtual tag indicator is set, the SPS 18 will indicate a virtual tag is present by setting the bits in a simulation ID field in a detection reply message from the SPS 18 to the application module 22 to an integer value (e.g., 99,999,999). Otherwise, the simulation ID field will be left as null, indicating the detection of a live target.

The application module 22 associates tracks with detections and forms instructions for outgoing signals. In one example, the application module 22 evaluates the simulation ID field in the detection reply message for the presence of the virtual tag. When track association logic (not shown) of the application module 22 associates a virtual detection with a track, it will tag that track as a virtual track if that track's previous identification state was a virtual track or if the track is a new track by setting the bits of a simulation object ID field in an internal object report message to the external communications interface 26 to an integer value (e.g., 99,999,999). Otherwise, the simulation object ID field will be left as null, indicating a live track.

From the subsequent signal received, the REX 12 generates digital I&Q that is passed to the SPS 18 following the analog-to-digital conversion, thus completing the cycle. Throughout processing, the external communications interface 26 translates tactical information received from the application module 22 and formats and transmits the tactical information for use by external systems (not shown). For example, the external systems include a command and control battle management communications (C2BMC) which is connected to a Ballistic Missile Defense System (BMDS). Thus, live and virtual tracks may be tagged accordingly and carried to external systems for further processing so that the external system may further benefit from distinguishing live and virtual tracks.

Figure 2:
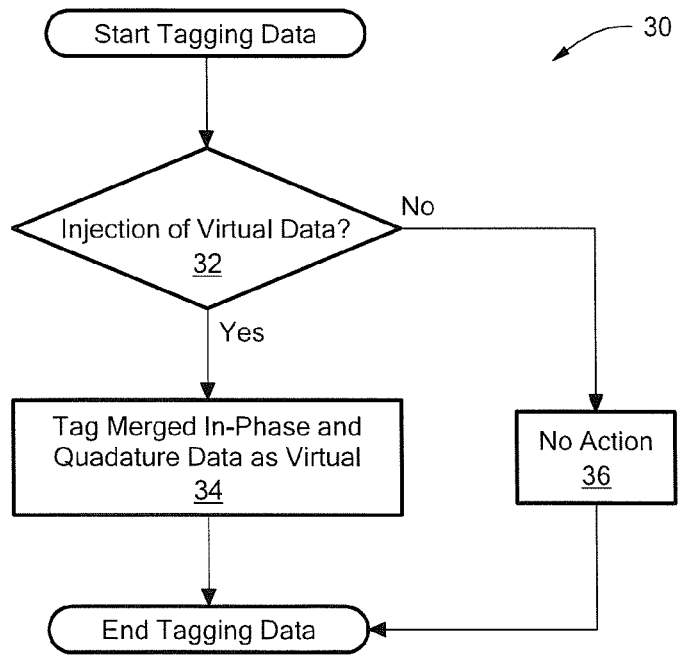
FIGS. 2 to 4 are flowcharts of processes used to track live and virtual tracks.

In one example, the radar interface 16 performs a process 30 for each receive time (range) window (FIG. 2). The radar interface 16 determines if the digital I&Q SIS 14 injected a virtual I&Q signal (32). For example, the digital I&Q SIS 14 tags injections as virtual within an I&Q header. For example, the digital I&Q SIS 14 tags digital I&Q messages to the radar interface 16 as virtual data by setting a bit in a message to a logical "1." In one example, the digital I&Q SIS 14 will tag digital I&Q messages to the radar interface 16 as virtual data by setting a bit in a resource period header. If the radar interface 16 determines that the digital I&Q SIS 14 injected a virtual I&Q signal, the radar interface 16 adds a tag to the virtual and live merged digital I&Q data indicating that a virtual digital I&Q data injection is present (34). Otherwise, if the radar interface 16 determines that the digital I&Q SIS 14 did not inject a virtual I&Q signal, no action is taken (36).

Figure 3:
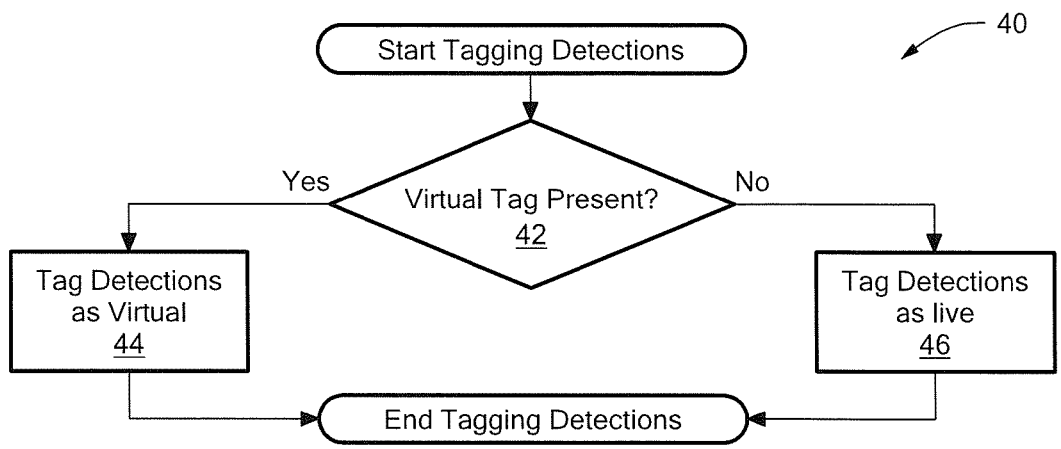

In one example, the SPS 18 performs a process 40 for each receive time (range) window (FIG. 3). The SPS 18 receives the merged virtual and live signal from the radar interface 16 and interprets the merged virtual and live signal to determine whether or not a virtual tag is present (44). Upon the detection of a virtual tag, the SPS 18 will then tag detections processed in this particular receive window as virtual tracks (44). If a virtual tag is not detected, the SPS 18 tags the detections as live tracks (46). The SPS 18 will pass the detection with the virtual/live tags to the application module 22 for track association.

Figure 4:
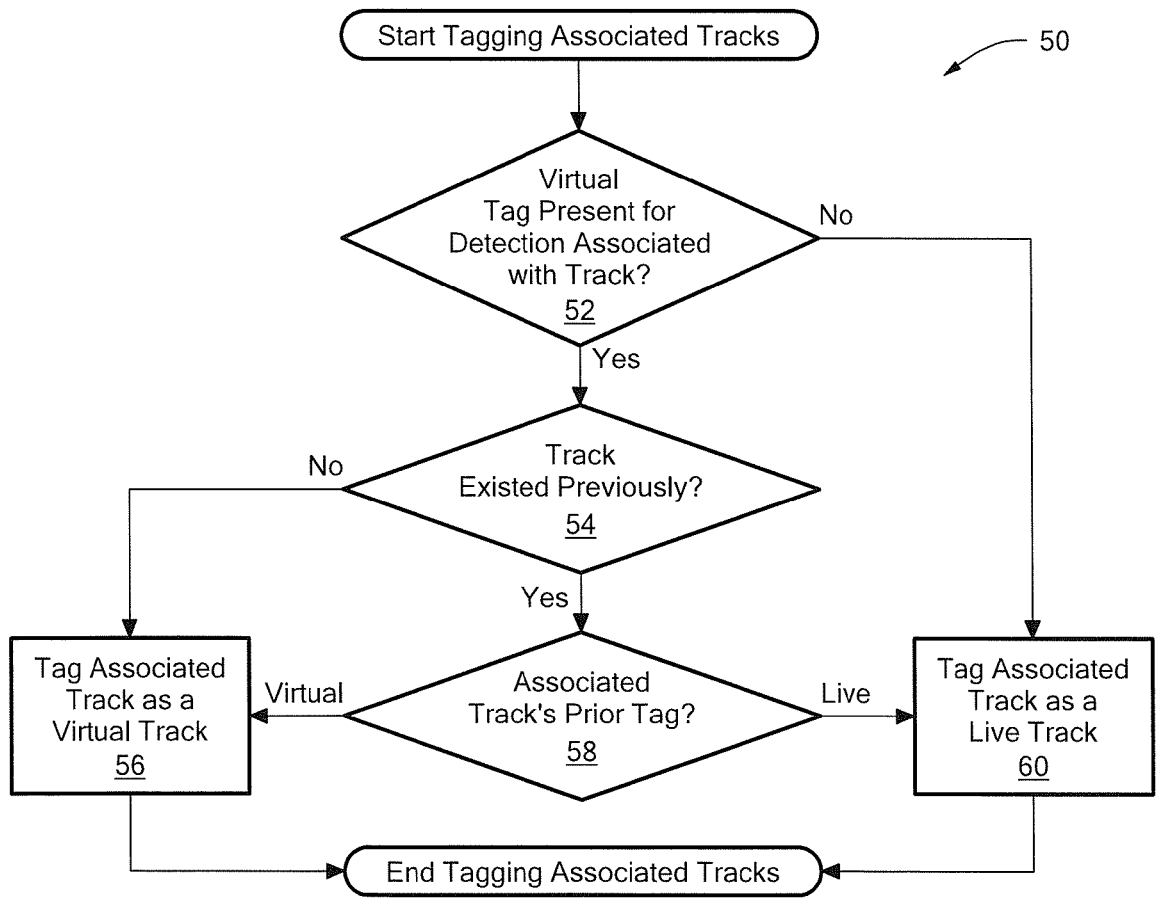

In one example, the application module 22 performs a process 50 for each track (FIG. 4). The application module 22 determines if a virtual tag is present for a detection associated with a track (52). If not, the associated track is tagged as a live track (60). If the virtual tag is present for a detection associated with a track, the application module 22 determines if the track previously existed (54). If the track did not previously exist, the associated track is tagged as a virtual track (56). If the track previously existed, the application module 22 determines the associated track's prior tag (58). For example, the application module 22 when performing the track association associates a live detection with a track, the track will always be tagged as a live track. If the track association associates a virtual detection with a track it will be tagged as a virtual track if that track's previous identification state was a virtual track or if the track is a new track.

Figure 5:
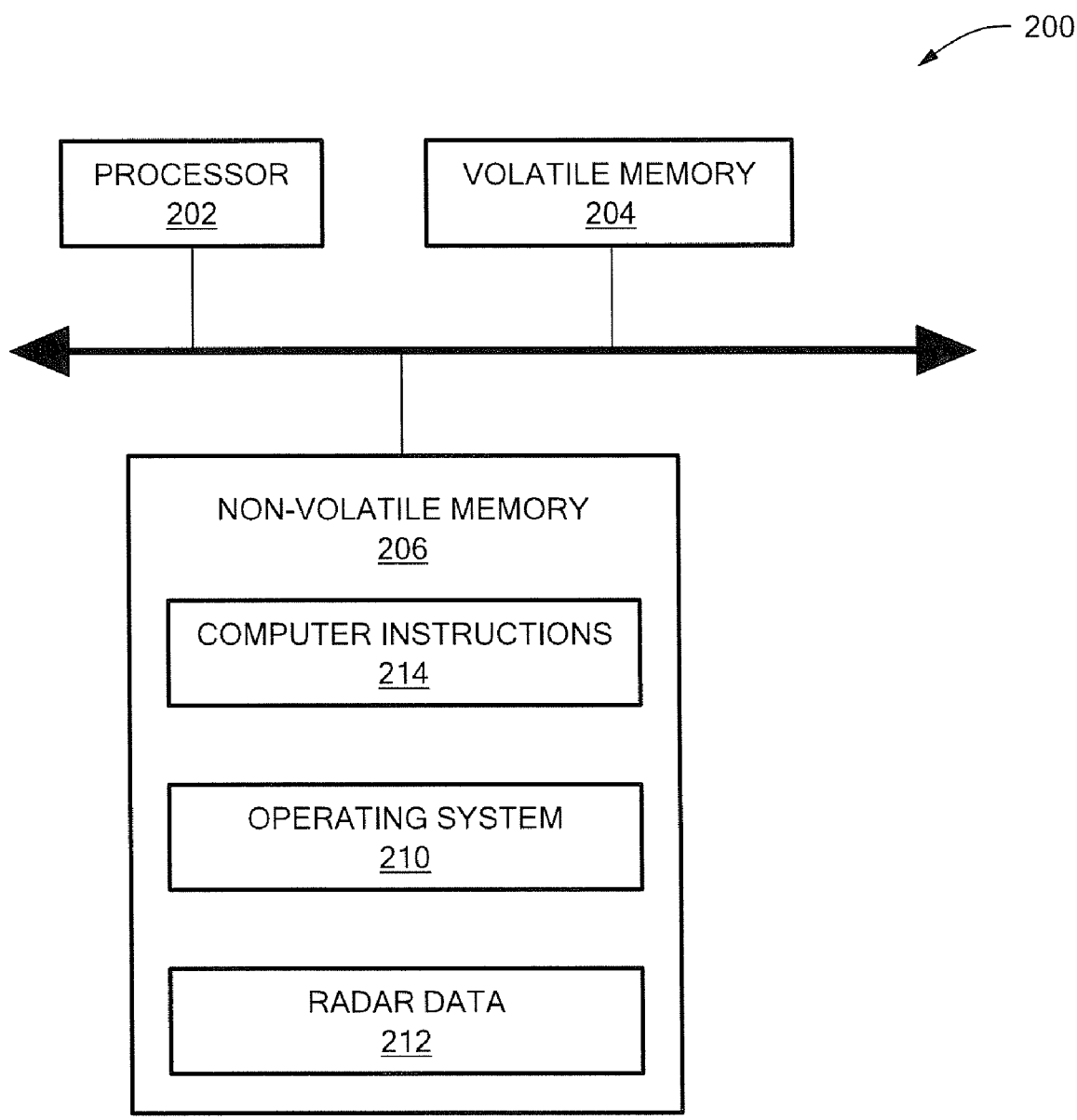
FIG. 5 is a block diagram of a computer used to execute one or more of the processes in FIGS. 2 to 4.

One or more of the digital I&Q SIS 14, the radar interface 16, the SPS 18 and the application module 22 may be implemented as a computer such as a computer 200 in FIG. 5, which may be used to execute a corresponding process (e.g., the radar interface 16 executes the process 30, the SPS 18 executes the process 40 and the application module 22 executes the process 50). The computer 200 includes a processor 202, a volatile memory 204 and a non-volatile memory 206 (e.g., hard disk). Non-volatile memory 206 includes an operating system 210, radar data 212 (e.g., live and virtual data) and computer instructions 214 which are executed out of volatile memory 204 to perform the respective processes (e.g., the processes 30, 40 and 50). In other embodiments, one or more of the digital I&Q SIS 14, the radar interface 16, the SPS 18 and the application module 22 may be combined.

Figure 6A:
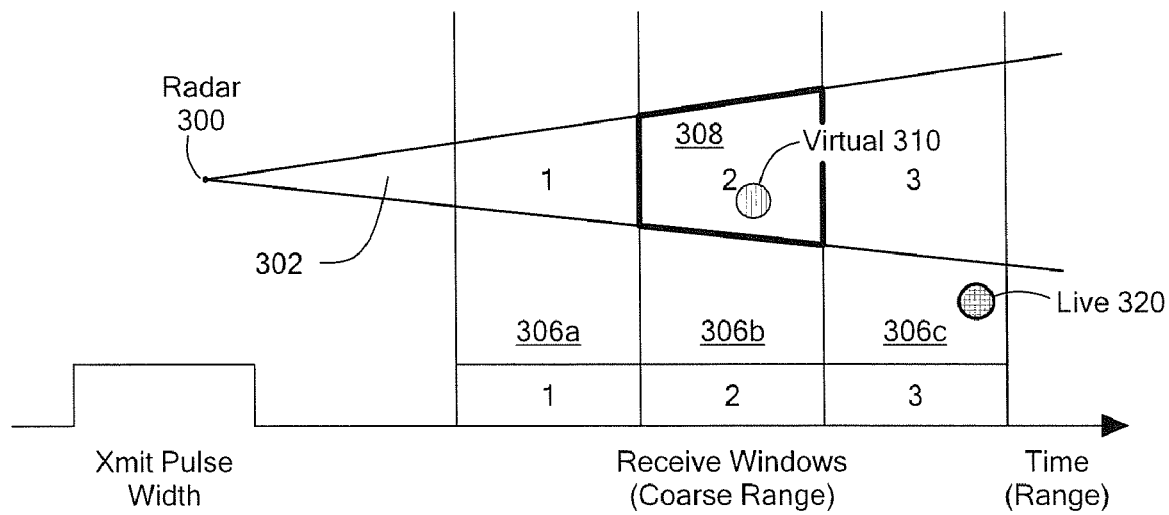
FIGS. 6A to 6E are various graphs depicting a live radar track and a virtual radar track widely spaced in range, azimuth and elevation for a period of time.
Figure 6B:
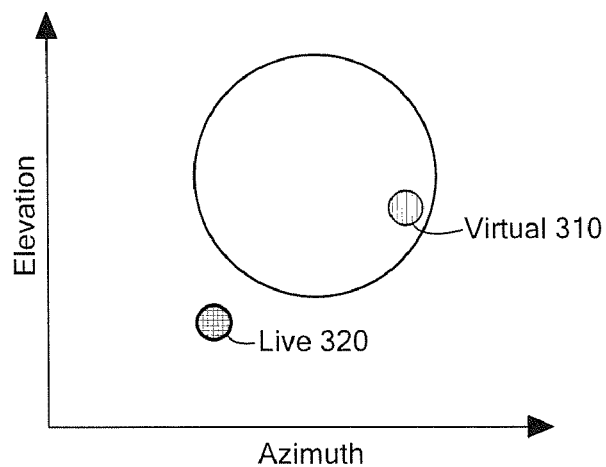
Figure 6C:
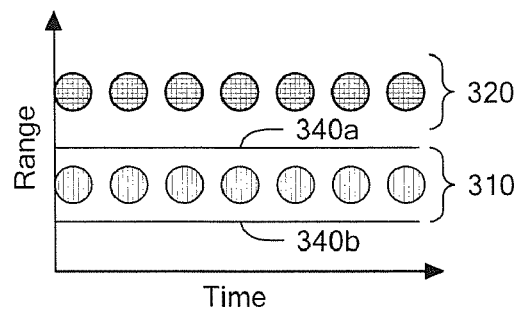
Figure 6D:
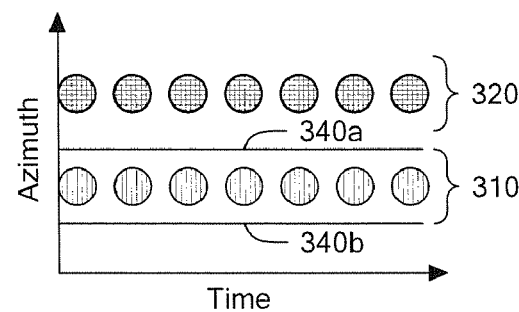
Figure 6E:
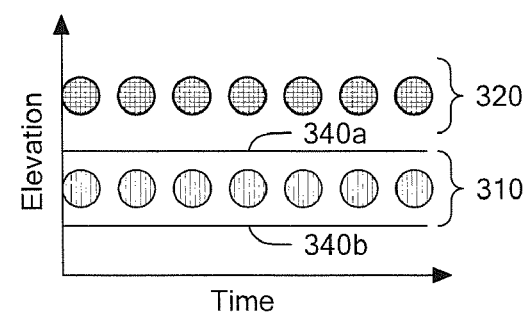

Referring to FIGS. 6A to 6E, a radar 300 transmits and receives a beam 302 within time windows (e.g., a first time window 306a, a second time window 306b and a third time window 306c. If a live track and a virtual track are widely spaced in range or azimuth or elevation, the radar processing system 10 is able to correctly label these tracks. All objects within a virtual tagged beam 308 bounded by the beam 302 and a time window, in this example, the second time window 306b, are tagged as virtual tracks. For example, the radar processing system 10 using the processes 30, 40, 50 tags a virtual track 310 in the second receive window 306b and the live track 320 in the third window 306c. Expressed differently the live track 320 is not with a upper bound 340a or a lower bound 340b of a virtual track 310 (FIGS. 6C to 6D).

Figure 7A:
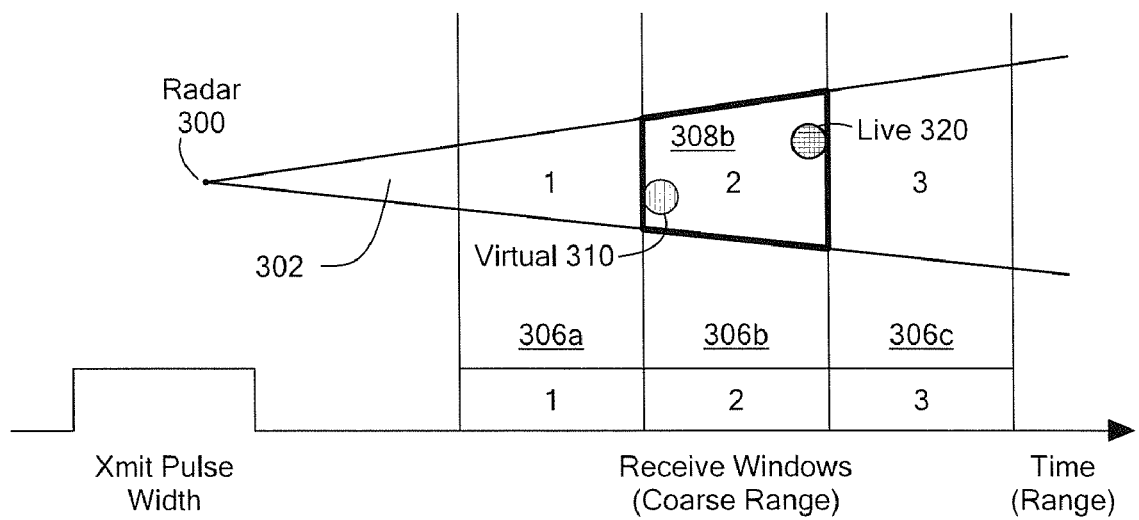
FIGS. 7A to 7E are various graphs depicting a live radar track and a virtual radar track initially closely spaced in range, azimuth and elevation for a period of time.
Figure 7B:
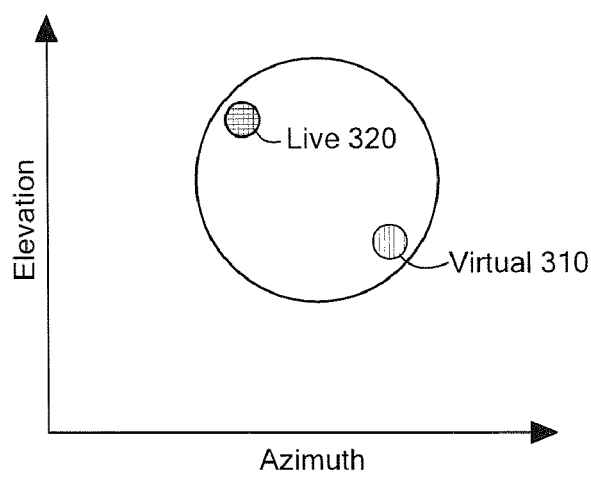
Figure 7C:
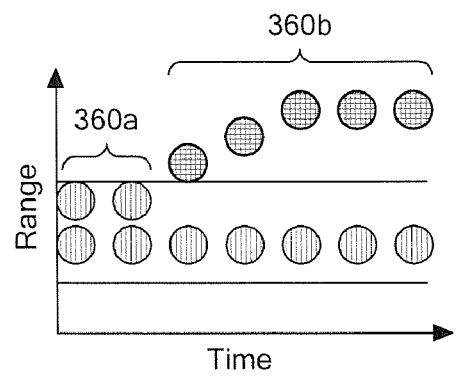
Figure 7D:
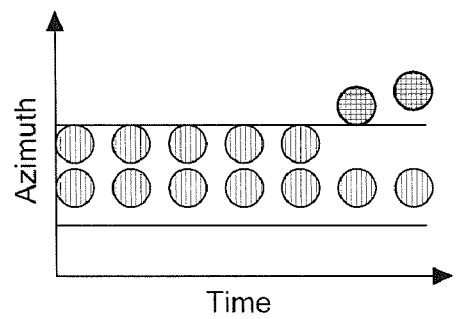
Figure 7E:
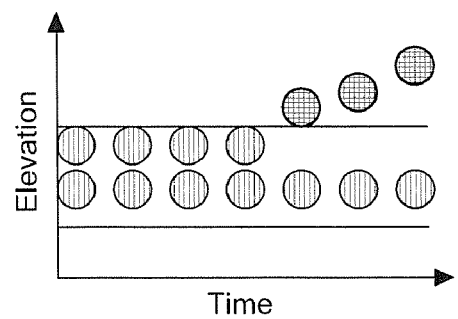

However, as shown in FIGS. 7A to 7E, if the live track 320 and the virtual track 310 are closely spaced in range, azimuth and elevation for a time period, the live track 320 will be considered a virtual track initially. In this case the live track and the virtual track are within the virtual tagged beam 308. For example, the live track is within the upper and lower bounds 340a, 340b of the virtual track for the first two time periods 360a (FIG. 7C). However, once the live track 320 exceeds the upper or lower bounds 340a, 340b in any one of the range, azimuth or elevation, the live track 320 is tagged as a live track going forward in time. For example, in the remaining time periods 360b in FIG. 7C the range exceeds the upper bounds 340a and the live track 321 will be labeled as a live track going forward in time.

The processes 30, 40, 50 may be used to implement a series of tagging rules. First, tracks that originate in the virtual tagged beam 308 are tagged as virtual tracks. Second, tracks that originate outside of the virtual tagged beam 308 are tagged as live tracks. Third, tracks that originate in a virtual tagged beam 308 but subsequently move out of the virtual tagged beam are tagged as live tracks after leaving the virtual tagged beam. Fourth, any track tagged as a live track is tagged as a live track for the remainder of its existence regardless of its position with respect to any virtual tagged beam. One of ordinary skill in the art recognizes that processes 30, 40 and 50 may be modified to implement a different set of rules.

The processes described herein are not limited to the specific embodiments described herein. For example, the processes are not limited to the specific processing order of FIGS. 2 to 4. Rather, any of the blocks of FIGS. 2 to 4 may be re-ordered, combined or removed, performed in parallel or in serial, as necessary, to achieve the results set forth above.

Processes 30, 40 and 50 are not limited to use with the hardware and software of FIG. 5; rather they may find applicability in any computing or processing environment and with any type of machine or set of machines that is capable of running a computer program. Processes 30, 40 and 50 may be implemented in hardware, software, or a combination of the two. Processes 30, 40 and 50 may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processes 30, 40 and 50 and to generate output information.

The system may be implemented, at least in part, via a computer program product, for execution by, or to control the operation of, data processing apparatus (e.g., a programmable processor, a computer, or multiple computers)). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer to perform processes 30, 40 and 50.

The system described herein is not limited to use with the hardware and software described above. The system may be implemented in digital electronic circuitry, or in computer hardware, firmware, software, or in combinations thereof.

Elements of different embodiments described herein may be combined to form other embodiments not specifically set forth above.

What is claimed is:

1. A method comprising:
    merging live radar data and virtual radar data to form merged data;
    tagging the merged data with a virtual tag indicator to indicate a presence of the virtual radar data;
    for each receive time window, determining if the virtual radar data is present from the virtual tag indicator;
    tagging a detection with a virtual tag if the virtual radar data is present;
    tagging detections with a live tag if the virtual radar data is not present, and
    implementing tagging rules to identify live tracks and virtual tracks, the tagging rules comprising:
        tagging a track that originated in a virtual tagged beam as a virtual track;
        tagging a track that originated outside of the virtual tagged beam as a live track;
        tagging a track that originated in the virtual tagged beam and subsequently moves out of the virtual tagged beam as a live track after leaving the virtual tagged beam; and
        tagging a previously tagged live track as a live track for the remainder of its existence.

2. The method of claim 1, further comprising determining if the virtual tag is present for a detection associated with a track.

3. The method of claim 2, further comprising, if the virtual tag is not present, tagging the associated track as a live track.

4. The method of claim 3, further comprising, if the virtual tag is present, determining if the track previously existed.

5. The method of claim 4, further comprising, if the track did not previously exist, tagging the associated track as a virtual track.

6. The method of claim 5, further comprising, if the track did previously exist, determining a prior tag of the track.

7. The method of claim 6, further comprising,
    if the prior tag of the track was a virtual tag, tagging the associated track as a virtual track; and
    if the prior tag of the track was a live tag, tagging the associated track as a live track.

8. The method of claim 1 wherein tagging the merged data with a virtual tag indicator to indicate a presence of the virtual radar data comprises setting a bit.

9. The method of claim 8 wherein setting a bit comprises setting a bit in a resource period header of a message.

10. A radar processing system, comprising:
    a radar interface to receive and merge live radar data and virtual radar data to form merged data, the radar interface configured to tag the merged data with a virtual tag indicator to indicate a presence of virtual radar data in the merged data;
    a signal processing system configured to determine if the merged data includes the presence of the virtual radar data from the virtual tag indicator, for each receive time window, the signal processing system being configured, if the merged data includes the virtual radar data, to tag a detection with a virtual tag and if the merged data does not include the virtual data, to tag the detection with a live tag; and
    an application module configured to associate tracks from the detections received from the signal processing system,
    wherein the radar processing system implements tagging rules to identify live tracks and virtual tracks, the tagging rules comprising:
        tagging a track that originated in a virtual tagged beam as a virtual track;
        tagging a track that originated outside of the virtual tagged beam as a live track;
        tagging a track that originated in the virtual tagged beam and subsequently moves out of the virtual tagged beam as a live track after leaving the virtual tagged beam; and
        tagging a previously tagged live track as a live track for the remainder of its existence.

11. The radar processing system of claim 10 wherein the application module is configured to:
    determine if the virtual tag is present for a detection associated with a track; and
    tag the associated track as a live track if the virtual tag is not present.

12. The radar processing system of claim 11 wherein the application module is configured to:

determine if the track previously existed if the virtual tag is present; and tag the associated track as a virtual track if the track did not previously exist.

13. The radar processing system of claim 12 wherein the application module is configured to:

determine a prior tag of the track if the track did previously exist;

tag the associated track as a virtual track if the prior tag of the track was a virtual tag; and tag the associated track as a live track if the prior tag of the track was a live track.

14. The radar processing system of claim 10 wherein the radar interface is configured to tag the merged data with the virtual tag indicator by setting a bit in a resource period header of a message from the radar interface to the signal processing system.

15. An article comprising a machine-readable medium that stores executable instructions to process virtual and live tracks to form a virtual-over-live environment, the instructions causing a machine to:

merge live radar data and virtual radar data to form merged data;

tag the merged data with a virtual tag indicator to indicate a presence of the virtual radar data;

for each receive time window, determine if the virtual radar data is present based on the virtual tag indicator;

tag a detection with a virtual tag if the virtual radar data is present;

tag the detections with a live tag if the virtual radar data is not present; and implement tagging rules to identify live tracks and virtual tracks, the tagging rules comprising:

tagging a track that originated in a virtual tagged beam as a virtual track;

tagging a track that originated outside of the virtual tagged beam as a live track;

tagging a track that originated in the virtual tagged beam and subsequently moves out of the virtual tagged beam as a live track after leaving the virtual tagged beam; and tagging a previously tagged live track as a live track for the remainder of its existence.

16. The article of claim 15, further comprising instructions causing a machine to:

determine if the virtual tag is present for a detection associated with a track;

if the virtual tag is not present, tag the associated track as a live track; and if the virtual tag is present, determine if the track previously existed.

17. The article of claim 16, further comprising instructions causing a machine to, if the track did not previously exist, tag the associated track a virtual track.

18. The article of claim 17, further comprising instructions causing a machine to, if the track did previously exist, determine a prior tag of the track.

19. The article of claim 18, further comprising instructions causing a machine to:

if the prior tag of the track was a virtual tag, tag the associated track as a virtual track; and if the prior tag of the track was a live track, tag the associated track as a live track.

20. The article of claim 15 wherein instructions causing a machine to tag the merged data with a virtual tag indicator comprises instructions causing a machine to set a bit in a resource period header of a message.

* * * * *

UNITED STATES PATENT AND TRADEMARK OFFICE
CERTIFICATE OF CORRECTION

| | | |
|---|---|---|
| PATENT NO. | : 7,612,710 B2 | Page 1 of 1 |
| APPLICATION NO. | : 11/872781 | |
| DATED | : November 3, 2009 | |
| INVENTOR(S) | : Lamendola et al. | |

It is certified that error appears in the above-identified patent and that said Letters Patent is hereby corrected as shown below:

Col. 4, line 38, delete "third window 306c." and replace with -- third receive window 306c. --.

Col. 5, line 25, delete "computers))." and replace with -- computers). --.

Signed and Sealed this

Twelfth Day of January, 2010

David J. Kappos
*Director of the United States Patent and Trademark Office*